US005608904A

United States Patent [19]
Chaudhuri et al.

[11] Patent Number: 5,608,904
[45] Date of Patent: Mar. 4, 1997

[54] METHOD AND APPARATUS FOR PROCESSING AND OPTIMIZING QUERIES HAVING JOINS BETWEEN STRUCTURED DATA AND TEXT DATA

[75] Inventors: Surajit Chaudhuri, Stanford; Umeshwar Dayal, Saratoga; Tak W. Yan, Stanford, all of Calif.

[73] Assignee: Hewlett-Packard Company, Palo Alto, Calif.

[21] Appl. No.: 387,527

[22] Filed: Feb. 13, 1995

[51] Int. Cl.$^6$ .................................................. G06F 17/30
[52] U.S. Cl. ...................................... 395/602; 364/DIG. 1
[58] Field of Search ................................................ 395/600

[56] References Cited

U.S. PATENT DOCUMENTS

| | | | |
|---|---|---|---|
| 5,315,504 | 5/1994 | Lemble | 364/400 |
| 5,367,677 | 11/1994 | Stanfill | 395/600 |

OTHER PUBLICATIONS

Yan, Tak et al., "Integrating a Structured–Text Retrieval System with an Object–Oriented Database System", Proceedings of the 20th VLDB Conference, Santiago, Chile, 1994.

Paepcke, Andreas, "An Object–Oriented View Onto Public, Heterogeneous Text Databases", IEEE, 1993, pp. 484–493.

Lee, Wan Lik, et al., "Integration of Text Search with ORION", IEEE, pp. 58–64.

Lynch, Clifford A., "Selectivity Estimation and Query Optimization in Large Databases with Highly Skewed Distributions of Column Values", Proceedings of the 14th VLDB Conference, Los Angeles, California 1988, pp. 240–251.

Chaudhuri, Surajit et al., "Query Optimization in the Presence of Foreign Functions", Proceedings of the 19th VLDB Conference, Dublin, Ireland, 1993, pp. 529–542.

Kemper, Alfons, et al., "Blackboard Architecture for Query Optimization in Object Bases", Proceedings of the 19th VLDB Conference, Dublin, Ireland, 1993, pp. 543–554.

Mitchell, Gail, "Control of an Extensible Query Optimizer: A Planning–Based Approach", Proceedings of the 19th VLDB Conference, Dublin, Ireland, 1993, pp. 517–528.

Carey, Michael, et al., "Extensible Database Management Systems", SIGMOD Record, vol. 19, No. 4, Dec. 1990, pp. 54–60.

Lynch, Clifford et al., "Extended User–Defined Indexing with Application to Textual Databases", Proceedings of the 14th VLDB Conference, Los Angeles, California 1988, pp. 306–317.

Faloutsos, Christos, "Access Methods for Text", Computing Surveys, vol. 17, No. 1, Mar. 1985, pp. 49–74.

*Primary Examiner*—Wayne Amsbury

[57] ABSTRACT

Probe-based query processing for a database system that loosely integrates a structured database and a text retrieval system is described. The query processing constructs a query plan that efficiently evaluates a conjunctive query having joins of structured and textual data by sending to the text retrieval system one or more text search/retrieve operations.

9 Claims, 4 Drawing Sheets

METHOD AND APPARATUS FOR PROCESSING AND OPTIMIZING QUERIES HAVING JOINS BETWEEN STRUCTURED DATA AND TEXT DATA

BACKGROUND OF THE INVENTION

1. Field of the Invention

The present invention relates to database systems and, more particularly, to a method and apparatus for optimizing queries accessing both structured data and text data.

2. Description of the Related Art

There is a growing number of text information sources available today. These text information sources range from traditional library information systems such as Library of Congress LOCIS and Stanford University FOLIO, to on-line services such as Dialog, and eventually to comprehensive digital libraries. Many applications and end users need to combine the retrieval of text information from these sources with structured data retrieved from other database systems. For example, a hospital information system may permit physicians to access a patient's medical record, progress notes, medical literature and drug formularies which are stored in one or more database systems.

Although structured database systems provide powerful query languages for querying structured data, such database systems are not well suited for storing or querying text information. For example, Structured-Query-Language (SQL) provides only rather primitive string matching operations. Text retrieval systems, on the other hand, use indexing techniques and processing algorithms that are specialized for querying text information, but have limited query languages. In particular, text retrieval systems do not support join-like operations for combining data from multiple sources.

Extensible database systems are known to provide "tight" integration of structured data and text. See e.g., M. Carey and L. Haas, "Extensible Database Management Systems," ACM SIGMOD Record, December 1990. These systems provide hooks in the data model, query language, and implementation architecture that allow new data types (e.g., text, maps, images) to be added.

However, it is important to distinguish between "tight" and "loose" integration. Tight integration assumes that the new data types are to be stored and processed within the database system, i.e., that the access methods and evaluation methods are visible to the query processor (and may in fact be modified to match the query processing strategies). See e.g., Bertino et al., "Query Processing in a Multimedia Document System," ACM Transactions on Office Information Systems, 6(1), 1988; W. Lee and D. Woelk, "Integration of Text Search with Orion," IEEE Data Engineering Bulletin, 13(1), 1990; and C. A. Lynch and M. Stonebraker, "Extended User-defined Indexing with Application to Textual Databases," VLDB, 1988. This previous work on tight integration considered query processing and optimization for queries on only textual data. On the other hand, loose integration assumes that the new data types are to be managed by external data managers. Once these specialized data managers have been registered with the database system, queries can include operations (sometimes called "foreign functions") over the new data types and operations that span multiple data types. Since the problem overcome by the invention relates to accessing external data sources, loose integration of a database system with external text sources is the only option available.

There has also been previous work on general frameworks for extensible query optimization. See e.g., H. Pirahesh et al., "Extensible/Rule Based Query Optimization in Starburst," SIGMOD, 1992; S. Chaudhuri and K Shim, "Query Optimizing in the Presence of Foreign Functions," VLDB, 1994; A. Kemper et al., "A Blackboard Architecture for Query Optimization in Object Bases," VLDB, 1993; and G. Mitchell et al. "Control of an Extensible Query Optimizer," VLDB, 1993. These previous works do not concern the problem of query processing for operations that span different data types or the impact of these methods on query optimization.

Further, query processing and optimization in the presence of foreign functions was examined in LDL (D. Chimenti et al., "Towards an Open Architecture for LDL," VLDB, 1989) and Papyrus (T. Connors et al., "The Papyrus Integrated Data Server," Proceedings of the First international Conference on Parallel and Distributed Systems, Miami Beach, Fla., Dec. 1991). However, in these works, the only join method used was tuple substitution and its variants. Tuple substitution corresponds to a nested loop join, with the relation as the outer operand and the document set as the inner. However, since it involves repeated invocations of the external data manager, in many cases tuple substitution will be prohibitively expensive.

There is recent work on optimizing queries over structured documents. See e.g., S. Abiteboul et al., "Querying and Updating the File," VLDB, 1993; V. Christophides, "From Structured Documents to Novel Query Facilities," SIGMOD, 1994; and M. P. Consens and T. Milo, "Optimizing Queries on Files," SIGMOD, 1994. The focus of this work was to reduce the amount of data retrieved from the text system for queries with complex selection conditions. This work did not address or provide a solution to the problem of integration between a database system and a text retrieval system.

Thus, there is need to loosely integrate the capabilities of both structured database systems and text retrieval systems to support uniform ad hoc queries over structured data and text.

SUMMARY OF THE INVENTION

Broadly speaking, the invention relates to a probe-based technique for processing a conjunctive query that includes one or more joins of structured data and textual data.

A first aspect of the invention is a method for executing a conjunctive query that includes joins of structured data from a structured database system and external textual data from a text retrieval system. The joins have multiple join predicates. The probe-based method first selects at least one probing column from the multiple join predicates, and then reduces execution time of the conjunctive query by probing the external textual database to eliminate redundant queries to the external textual database which produce no matching documents.

A second aspect of the invention is a method for processing a conjunctive query that includes joins of structured data from a structured database and external textual data from a text retrieval system. The method selects at least one probing column from the multiple join predicates if one or more of the joins has multiple join predicates, and then determines an estimated cost of at least one probe-based optimization plan. In addition, the method determines an estimated cost of at least one conventional optimization plan. Thereafter, the method selects one of the optimization plans based on the lowest estimated cost. The conjunctive query is then evaluated in accordance with the selected optimization plan.

A third aspect of the invention is a loosely integrated database system capable of evaluating a conjunctive query that includes joins of structured data and external textual data. The joins have multiple join predicates. The system includes a text retrieval system having textual data, and a structured database system having structured data. The structured database system includes a query optimizer for selecting an optimal execution plan from a plurality of available execution plans based on cost, and a query executor for executing the optimal execution plan to evaluate the conjunctive query, When the optimal execution plan is a probe-based execution plan, the query executor reduces execution time of the conjunctive query by probing the external textual database to eliminate redundant queries to the external textual database which produce no matching documents.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–5. However, those skilled in the art will readily appreciate that the detailed description given herein with respect to these figures is for explanatory purposes as the invention extends beyond these limited embodiments.

The invention relates to query processing for a loose integration of a database system and a Boolean text retrieval system, which is the most common class of text system commercially available today. The query processing according to the invention operates to construct a query plan that efficiently evaluates a conjunctive query that involves joins of structured and external textual data by sending to the text retrieval system one or more text search/retrieve operations.

Because the invention is implemented by a loosely integrated database system, initially the construction of such a database system is first described.

Figure 1:
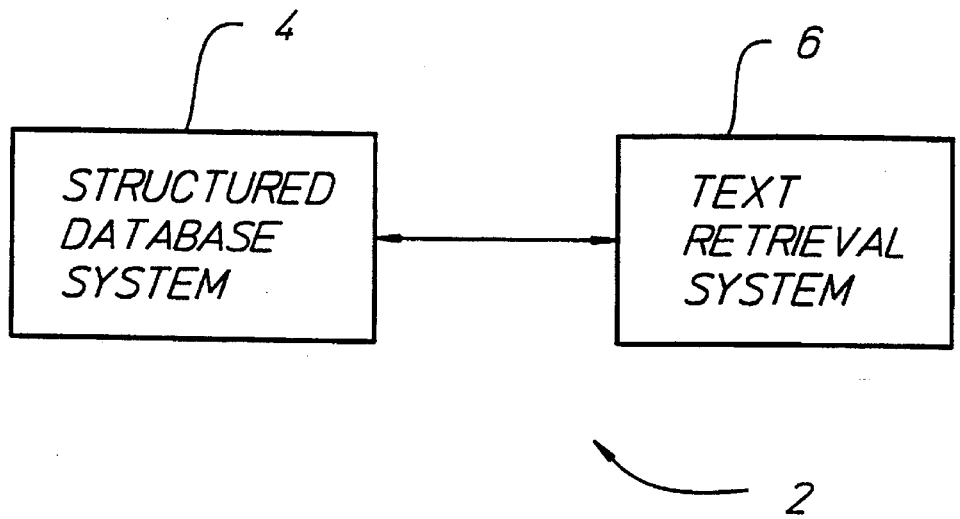
FIG. 1 is a block diagram of a loosely integrated database system.

FIG. 1 is a block diagram of a loosely integrated database system. The integrated database system 2 includes a structured database system 4 and a text retrieval system 6. The structured database system 4 is loosely integrated with the text retrieval system 6. The structured database system 4 accesses the text retrieval system 6 via search and retrieve operations. The structured database system 4 can be either an object-oriented database or a relational database. It is assumed that the text retrieval system's internal data structures are not accessible to the structured database system 4, and there are no special structures in the text retrieval system 6 that correlate with the structured database system 4. These assumptions imply that joins involving text data have to be executed as instantiated selections on the text retrieval system 6.

First, it is useful to describe the characteristics of a text retrieval system. There are three main classes of retrieval models found in current text retrieval systems: boolean, vector space, and probabilistic. The most commonly used model is the boolean model. For purposes of the following detailed description, it is assumed that the external text sources use the boolean model of retrieval.

A text retrieval system manages a collection of documents. Each document has a document identifier (docid) that uniquely identifies the document. A document contains one or more text fields. In bibliographical systems, examples of such text fields include author, title, abstract, date, and the like. A user locates documents of interest by issuing a search. A basic search term can be a word (e.g., 'filtering'), a truncated word (e.g., 'filter?'), or a phrase (e.g., 'information filtering'). The set of all searchable words is called the vocabulary. If there is more than one text field, the search may be limited to a certain scope, e.g., AU='smith'. Some systems support proximity searches (e.g., 'information' near10 'filtering'). These search terms can be combined to form complex search expressions using boolean connectors—and, or, and not.

Documents that exactly match a search expression are returned as results of the search, called the result set. This set contains the docids of matching documents; it may also contain some of the text fields. Typically, not all the text fields are returned, and the user may subsequently retrieve the entire document using its docid. This abbreviated format of a result set is known as the short form, and the entire document retrievable by docid is known as the long form. In some systems, the short form may include the cardinality of the result set.

To support fast searching, most text retrieval systems use text access methods such as inverted indexes and signature files. See e.g., C. Faloutsos, "Access Methods for Text," ACM Computing Surveys,"17(1):50–74, 1985; and G. Salton, "Automatic Text Processing," Addison Wesley, Reading Mass., 1989. Because inverted indexes are more appropriate in large-scale systems, the following detailed description concentrates on inversion-based text retrieval systems. In an inverted index, each word is associated with an inverted list of postings that record the docids of documents in which the word appears. A posting may also contain information such as the field the word occurs in and the position. It is assumed that the inverted lists reside on disk, and a main memory directory maps a word to the location of its list. To process a search, inverted lists are retrieved and set operations are performed on the lists. For example, the search 'information' and 'filtering' is performed by retrieving the lists for 'information' and 'filtering' and intersecting the lists. Typically, the lists are sorted and set operations take time linear in the lengths of the lists.

Given a search, a text retrieval system may perform run-time optimization. A simple example is to reorder the search terms to evaluate the most selective ones first. See e.g., C. A. Lynch, "Selectivity Estimation and Query Optimization in Large Databases with Highly Skewed Distributions of Column Values," VLDB, 1988. On the other hand, there are systems that just execute searches in a left-to-right order. The processing and optimization strategies of the present invention work for both cases.

The foreign function capability supported in extensible database systems enable loose integration of external data servers such as text systems. Such integration has been implemented by tying a database system OpenODB from Hewlett-Packard Company with Project Mercury server from Carnegie-Mellon University. Project Mercury is an ongoing digital library project and its server makes available a number of text databases. The particular database referred to below is a Computer Science Technical Report (CSTR) database, containing bibliographic records from a consortium of universities.

To the user of the integrated system, such an external text source appears as a relation. For ease of presentation, the query examples use a SQL-like syntax. A document is a tuple and the fields are its attributes. For example, the relation "mercury" is defined as:

create table mercury
(docid varchar, title {varchar}, author {varchar}, abstract{varchar}, ... )

The syntax for a text search predicate is <search term> in <field>. If the search term is found in the field, the predicate is true. In general, the search term may be a single word or a phrase. In this detailed description, the focus is on conjunctive queries such as Select-Project-Join queries. An example of a Select-Project-Join query is as follows:

select * from student, mercury
where student.advisor='Garcia' and 'text' in mercury.title and student.name in mercury.author;

The example query is essentially a "join" between the relational data and the document data on the names of Garcia's students and the authors of Mercury documents that have the word 'text' in the title. Previous work has addressed issues such as query translation and document schema importation for such a loosely integrated system. Such previous work is described in T. W. Yan and J. Annevelink, "Integrating a Structured-text Retrieval System with an Object-oriented Database System," VLDB, 1994; and A. Paepcke, "An Object-oriented View into Public, Heterogeneous Databases," ICDS, 1993, which are both hereby incorporated by reference.

Next, alternative ways of evaluating queries that span the structured database (e.g., relational) system 4 and the text retrieval system 6. The various approaches described here pertain to queries having at least one join between one relation and the text system. Hence, joins of this type are referred to as foreign joins.

The usual conventional way of evaluating a foreign join is tuple substitution (TS). See e.g., T. W. Yah and J. Annevelink, supra. Tuple substitution may be best viewed as a nested loop join where the relational table is the outer relation. Thus, every tuple of the relational table is instantiated in turn. For each instantiation, the join predicates on the text retrieval system turn into additional selection conditions for the text system. Such an instantiated query is now evaluable by the text system, as illustrated in the following example query Q1.

Q1: select * student, mercury
where student.area='artificial intelligence' and student.year >3 and 'belief update' in mercury.title and student.name in mercury.author The relation student stores information about graduate students in the department. The query selects senior students (year >3) in the artificial intelligence area who have written technical reports on the topic of belief update. For every instance of the student tuple, a query is invoked. Thus, for a student tuple that binds the value of student.name to Radhika, the corresponding query to Mercury obtained by the above tuple substitution is: TI='belief update' and AU='Radhika'.

As one can observe, the number of queries invoked is equal to the cardinality of the relational table. As a result, for large relational tables, the conventional tuple substitution method will be prohibitively expensive.

After having described the construction of a loosely integrated database system, the details of the invention are now described.

The present invention provides alternatives to tuple substitution that can be used to evaluate foreign joins to take advantage of the structure of the query. The invention utilizes a probing technique for doing joins with text systems.

It is known from distributed query processing systems that when joining two relations, there is a choice of site as to where the join is done. Because the structured database system (e.g., SQL) provides some, though limited, ability to do string processing, the structured database system could be used to evaluate the text join predicates. However, this approach is only practical when all the text join predicates require no more than SQL-supported string processing. Specifically, when the text predicates in the query are on short structured fields (e.g., author or title field), this alternative might be applicable. This approach further requires that there are selection conditions on the text data.

Thus, relational text processing (RTP) proceeds as follows. First, a query that contains only the text selection conditions is sent to the text system. Next, the returned documents are matched with the relational tuples by a traditional join method (e.g., nested loop) using the string matching functions in SQL. In contrast to tuple substitution where the number of queries sent to the text system is equal to the number of tuples in the relation (or, at least the number of distinct values in the join columns), this approach requires only a single query to be sent to the text retrieval system. Thus, if the text selection conditions on the text are highly selective, then relational processing could outperform tuple substitution.

Applying this method to example query Q1 results in the following single query to Mercury: TI='belief update'. There were only a few bibliographic entries in Mercury that had 'belief update' in the title. Since the text processing needed at the relational end was simple, relational processing can do significantly better than tuple substitution.

The invention relates to probing-based techniques. When the foreign join between the text and the relation has multiple join predicates, then the probing-based technique becomes applicable.

Let Q be a text-relational query Q, where R is the set of all text selection predicates and all text-join predicates in the query Q. A probe $Q_P$ is a query to the text system obtained by removing all join predicates from R in Q except those in the set P, and requiring the text system to return only the information whether there are any matching documents. This may be accomplished by requesting a suitable short form response from the text system. A column in the set P is called a probing column. It follows that if $Q_P(t)$ is unsatisfiable, then a query $Q(t')$ is unsatisfiable if $\pi_P(t)=\pi_P(t')$, i.e., if the tuples t and t' agree on the columns in P.

Thus, the failure of a probe to return any matching document indicates that instantiating the query with tuples that agree with the probe on the probing columns will also yield fail-queries.

An example query Q3 follows. In example query Q3, relation project stores information about research projects. The query selects names and members of NSF-funded projects, together with the docids of technical reports that have the project names in the titles and are written by the project members.

Q3: select project.member, project.name, mercury.docid
from project, mercury
where project.sponsor='NSF' and project.name in mercury.title and project.member in mercury.author;

Consider a probe Q3' for Q3 with the probing column project.name. If there are no documents in Mercury with the word PWS in the title, then the probe Q3', instantiated with project.name='PWS' returns no matching documents. Therefore, it follows that tuple substitutions with all tuples that have project.name='PWS' (say, with project.member= 'Desmedt' or project.member='Pham' will return no matching documents.

For probes to have a significant effect on reducing the invocation of fail-queries, there are two requirements: (1) the predicates on the probing columns should be selective; and (2) the cardinality of the relation, projected over the probing columns, should be a relatively small fraction of the total number of tuples. These requirements ensure that the failure of an instantiated probe helps avoid multiple fail-queries. The choice of the set of probing columns will influence the effectiveness of the probe. The set of probing columns is determined at compilation time by the optimizer using a cost model. The selection of the probing columns and the details of the cost model are discussed later below.

Figure 2:
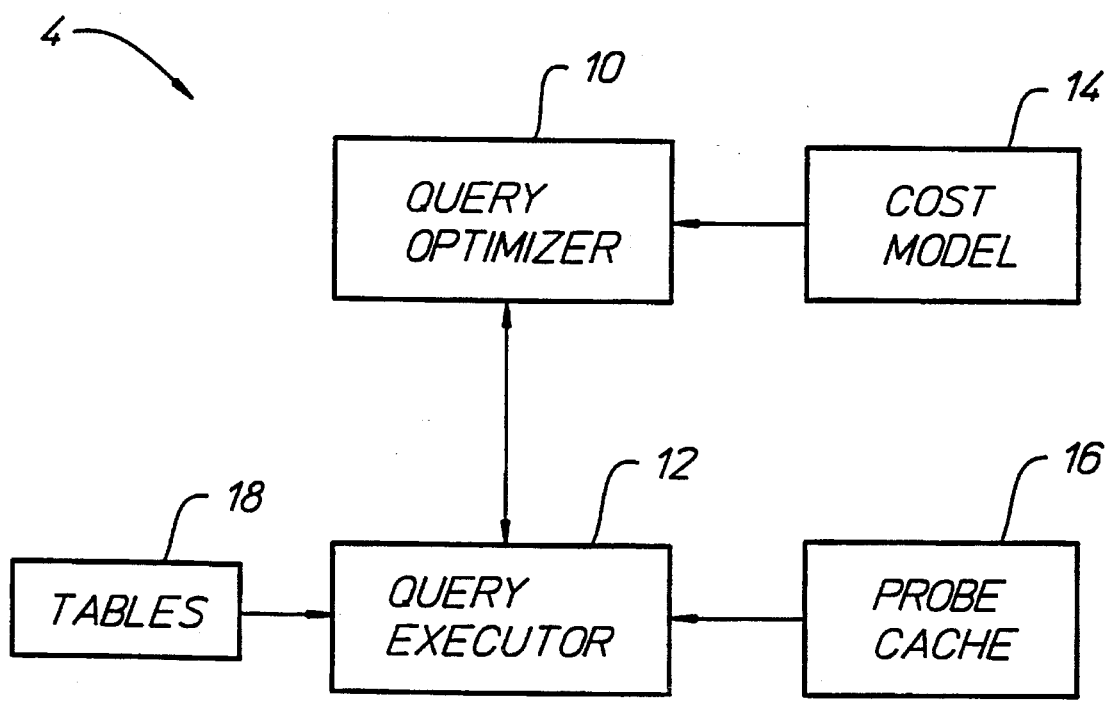
FIG. 2 is a block diagram of a structured database system according to the invention.

FIG. 2 is a block diagram of a structured database system 4 according to the invention. The structured database system 4 includes a query optimizer 10, a query executor 12, a cost model 14, a probe cache 16, and relational tables 18. The operations performed by the query optimizer 10 and query executor 12 are described in detail below with reference to FIGS. 3–5. An embodiment of the cost model 14 is also described in detail below. The use of the probe cache 16 is explained below. The relational tables 18 are known in the art.

Figure 3:
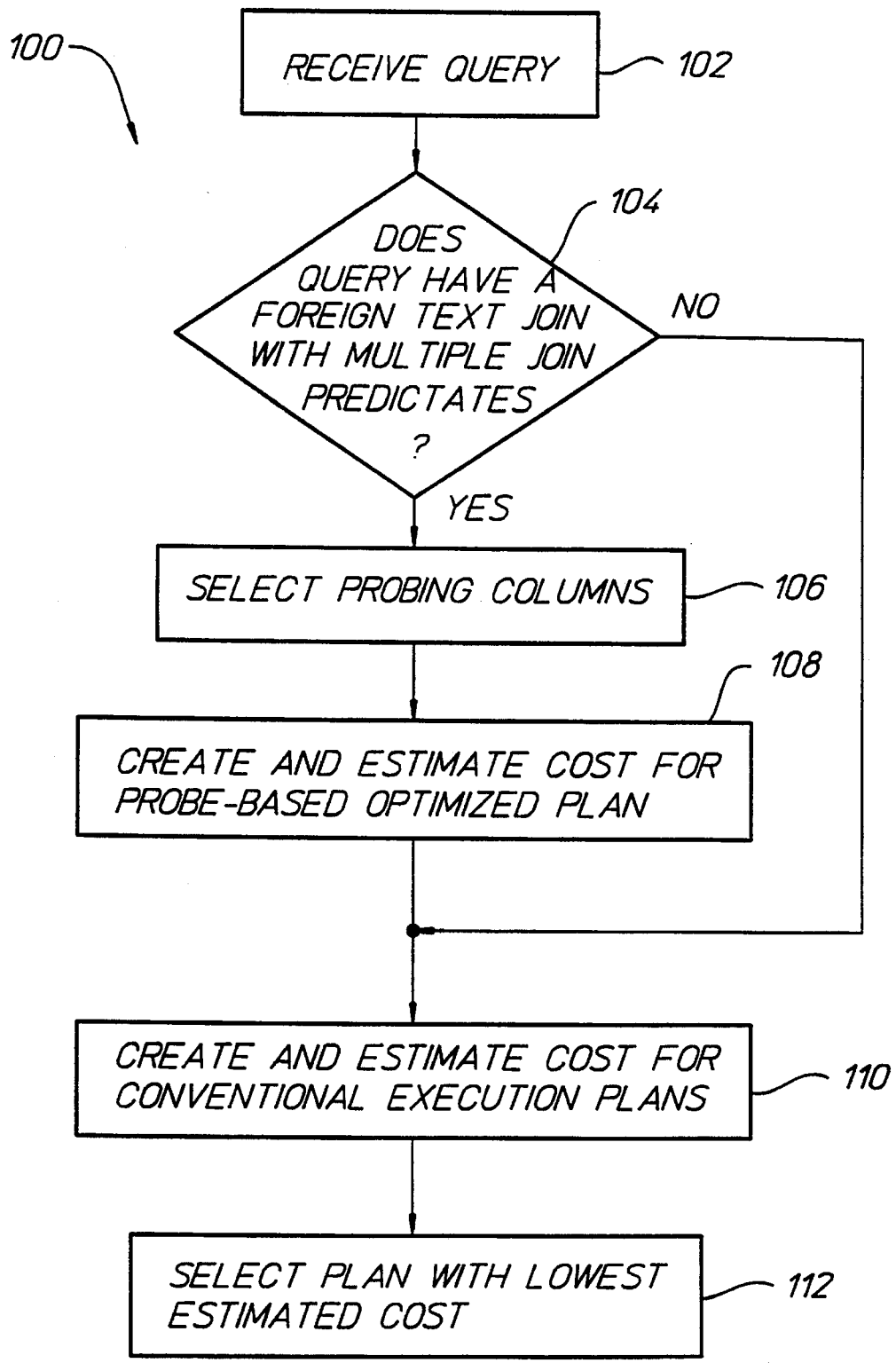
FIG. 3 is a flowchart of a basic optimization method according to the invention.

FIG. 3 is a flowchart of a basic optimization method 100 according to the invention. The operations shown in FIG. 3 are performed by the query optimizer 10. The basic optimization method 100 begins by receiving 102 a query to be processed. A decision 104 is then made based on whether the query includes a foreign text join with multiple join predicates. If so, then probing columns are selected 106. The process for selecting the most effective probing columns is described in detail below. Once the probing columns are selected 106, a probe-based optimization plan is created and its cost estimated 108.

Following block 108 or following block 104 in the case when the query does not include a foreign text join with multiple join predicates, conventional execution plans are created and estimated 110. Thereafter, the plan with the lowest cost is selected 112 from the probe-based optimization plan and the conventional execution plans. The lowest cost plan is then forwarded to the query executor 12 to be executed.

Probing acts to avoid invocation of failed queries. By itself, probing is an adequate technique for a semi-join of the relation by the text (i.e., if we want to project only over the attributes of the relation). However, to implement a join, probing must be combined with other join methods. Namely, probing can be used with the tuple substitution technique or with the relational text processing technique. First probing with tuple substitution is described; thereafter, probing with relational text processing is described.

1. Probing with Tuple Substitution

Figure 4:
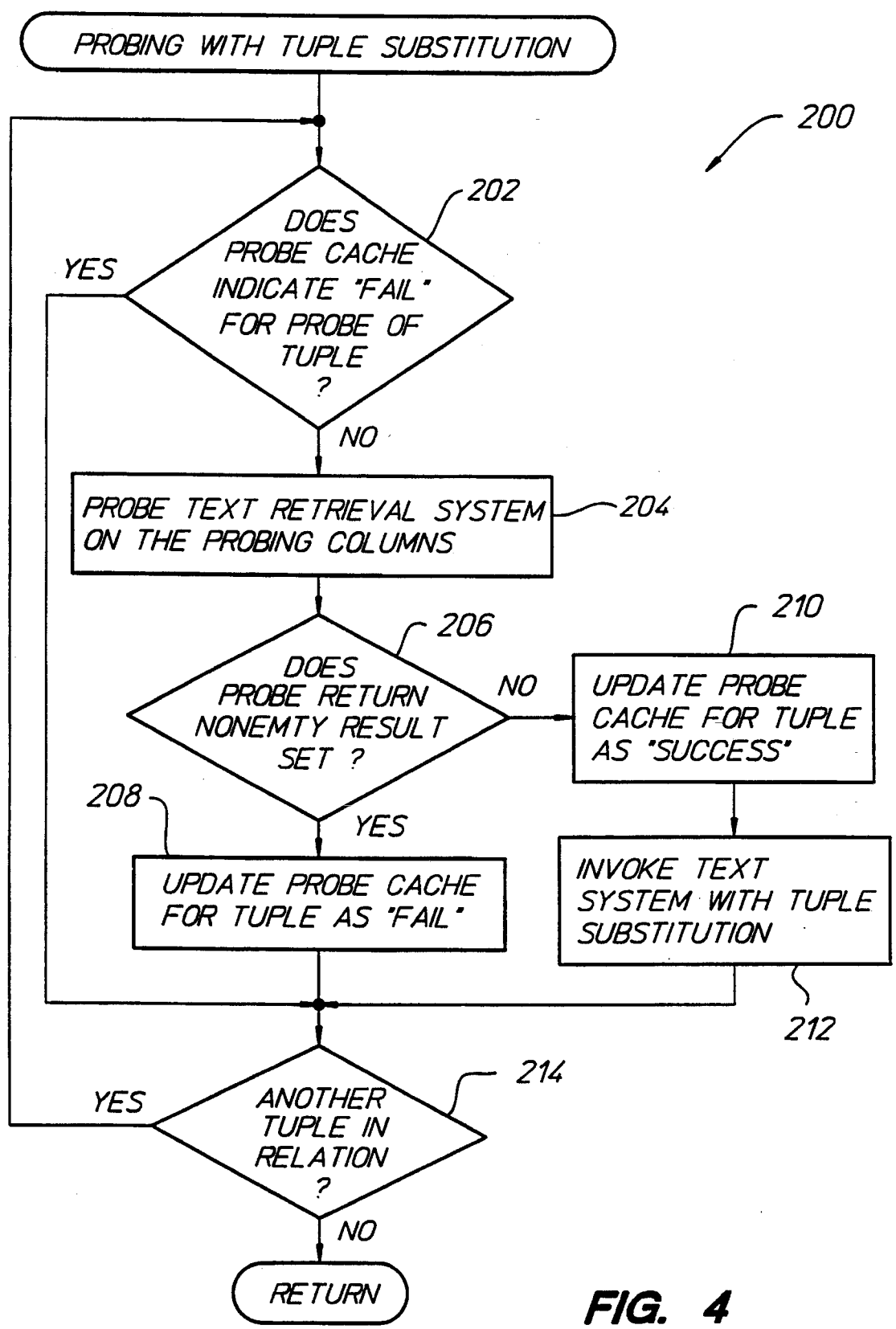
FIG. 4 is a flowchart of a first probe-based query evaluation method which uses probing with tuple substitution.

The steps carried out in probing with tuple substitution join method 200 are illustrated in FIG. 4. A probe cache 16 (FIG. 2) is used here to remember the set of all past probes (for one query), so that no duplicate probes are sent.

First, starting with the first tuple in a relation, the probe cache 16 is checked to determine 202 whether the probe of the particular tuple is indicated as "fail". If so, then probing has determined that neither probing nor tuple substitution with the particular tuple need be performed because the probe cache 16 indicates that no documents would match.

On the other hand, if the probe cache 16 indicates either "success" or "empty" for the tuple, then the text retrieval system 6 is probed 204 on the probing columns. A decision 206 is then made based on the result of the probe 204. If the probe 204 returns a nonempty result set, then the probe cache 16 for the tuple is updated 208 as "fail". Otherwise, the probe cache 16 is updated 210 as "success" and tuple substitution is performed 212.

Next, following either block 208 or 210, a decision 214 is made based on whether any tuples remain in the relation to be probed. If there are other tuples in the relation to be probed, the decision 214 causes the process flow to return to block 202 so that blocks 202–214 are repeated until all tuples of the relation are considered.

A variant of the probing with tuple substitution technique is to perform a probe only after a given query is marked "fail". This method also minimizes cost by ensuring that no duplicate probe is sent.

Another variant of the probing with tuple substitution technique is where the tuples of the relation are ordered (or, grouped) by the probing columns. In such case, no caching is required. Furthermore, in such a case, a probe is sent only if there is at least another tuple in the relation that matches the probing columns of the tuple which resulted in a fail-query.

Consider the example query Q3. First, assume that the relation project is unordered. In such a case, a tuple substitution for the tuple project.name='PWS', project.member= 'Desmedt' is done first, and on failure, the column project.name is probed. Since the probe fails, no query is invoked for the tuple project.name='PWS', project.member='Pham'. Next, assume that the relation project is ordered by project.name and that the project 'Foo' has only one member 'Smith'. Then, a failure on tuple substituting project.name= 'Foo', project.member='Smith' does not lead to any probes.

The potential benefits of probing can be quantified by contrasting it with the cost of simple tuple substitution. Assuming that the cardinality of the projection over J columns is N, and the number of tuples in the relation is N. If s is the joint selectivity of predicates over the J columns, then the number of queries sent in this method is $N_J+sN$, whereas the number of queries sent by the tuple substitution method is simply N. If $N>N_J/(1-s)$, then the probing based tuple substitution sends fewer queries.

2. Probing with Relational Text Processing

Figure 5:
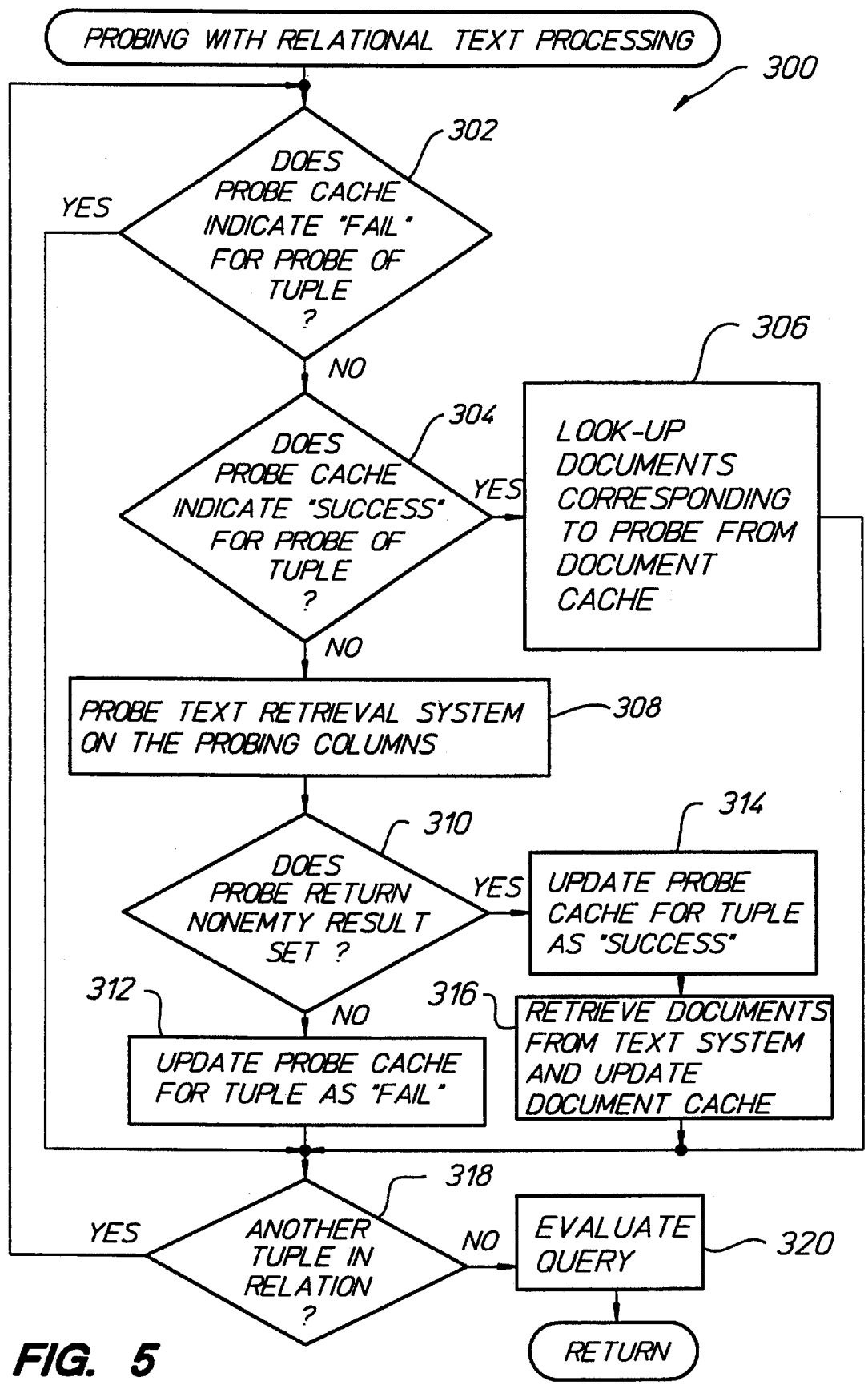
FIG. 5 is a flowchart of a second probe-based query evaluation method which uses probing with relational text processing.

The steps carried out in probing with relational text processing join method 300 are illustrated in FIG. 5. This method is similar to probing with tuple substitution.

In this method 300, if a probe succeeds, then the documents matched by the probe are transmitted to the relational end where the remaining join predicates are evaluated using SQL capabilities. As in the probing with tuple substitution method, this technique also requires caching past invocations on the probe columns (or, the relation should be ordered on probing columns). Further, unlike the probing with tuple substitution method, the method 300 causes a list of docids returned by the probe to be stored in a document cache (not shown). The document cache (not shown) is maintained subject to a cache replacement policy. The document cache reduces cost by reducing the need to fetch documents repeatedly.

First, a decision 302 is made based on the contents of the probe cache 16. If the probe cache 16 indicates "fail" for the probe of a particular tuple, then probing with the particular tuple need not be performed because the probe cache 16 indicates that no documents would match. If the probe cache 16 indicates other than "fail", then the method proceeds with decision 304. The decision 304 is made based on whether the probe cache 16 indicates "success" for the probe of the particular tuple. When "success" is found in the probe cache 16, a past invocation on the same values of the probe columns has already been performed. Therefore, no probing is needed for this tuple and documents corresponding to the previously successful probe are looked-up 306 from the document cache.

Alternatively, if the decision 304 indicates other than "success", then the text retrieval system 6 is probed 308 on the probing columns. Next, a decision 310 is made based on the result set returned by the probe 308. In particular, if the probe 308 returns an empty result set (i.e., no documents match), then the probe cache 16 for the particular tuple is updated 312 as "fail". On the other hand, if the probe 308 returns other than a nonempty result set (e.g., docids of documents which match), then the probe cache for the particular tuple is updated 314 as "success", the documents are retrieved from the text system, and the document cache is updated 316 with the documents identified by the result set.

Following either block 312 or 316, a decision 318 is made based on whether any tuples remain in the relation to be probed. If there are other tuples in the relation to be probed, the decision 318 causes the process flow to return to block 302 so that blocks 302–318 are repeated until all tuples of the relation are considered. After all the tuples in the relation have been considered, the query is evaluated 320.

For this method to be effective, the probe conditions must be selective so that not too many documents are retrieved and there must be a significant overlap among documents needed in different invocations so that the total number of documents retrieved is small. Note that simple relational processing is dependent crucially on the selectivity of the selection conditions and cannot take advantage of such overlaps. On the other hand, probing with relational text processing achieves a performance advantage using the overlaps.

The following example query Q4 illustrates an application. The example query Q selects students in the distributed systems area who have co-authored reports with their advisors.

Q4: select * student, mercury
where student.area='distributed systems' and student.advisor in mercury.author and student.name in mercury.author;

Suppose the number of distinct advisors is small and they are not very prolific. Then a small number of documents are retrieved, and the relational database system can quickly evaluate them against the tuples with successful probes.

As briefly discussed above with reference to FIG. 2, the query optimizer 10 makes use of cost information provided by the cost model 14. The cost model 14 includes a cost formula for each of the join methods mentioned above. Cost refers to execution time for a query. The cost model presented here is the preferred embodiment, but it should be recognized that numerous other cost models could be used.

The cost involved in accessing a text retrieval system consists of three components: invocation cost, processing cost, and transmission cost. The invocation cost includes the overhead of invoking a foreign function and transmitting the query. It is assumed that this is a constant cost $c_i$.

To process a query, text retrieval systems typically read inverted lists into main memory and perform set operations on these lists. Since the lists are sorted, the time needed to perform the set operations is linear with respect to their lengths. It is assumed that intermediate lists needed in performing the set operations also fit in main memory, and there is no writing out of lists. The processing cost is thus proportional to the sum of the lengths of the inverted lists processed and the proportionality constant is denoted by $c_r$. The transmission cost includes the cost of transmitting the results and scanning them to extract field data. It is assumed the total cost is proportional to the cardinality of the result set. The transmission costs for long and short form documents differ and are represented by distinct proportionality constants $c^l_t$ and $c^s_t$, respectively.

Hence, the cost formula for a single text search is:

$$c_i + c_r \times \text{SUM OF LENGTHS OF INVERTED LISTS PROCESSED} + c_t \times \text{CARDINALITY OF RESULT SET}$$

A number of queries were executed and used to calibrate the integrated OpenODB-Mercury system. The values which were obtained are: $c_i = 3$, $c_r = 0.00001$, $c^l_t = 4$, and $c^s_t = 0.015$. It should be noted that (i) the invocation cost is significant as each invocation requires a connection to the Mercury server; and (ii) the long-form transmission cost is more expensive than the short-form cost by orders of magnitude as each retrieval requires a separate connection.

With the join methods according to the invention, relational text processing may be performed by string matching. In such case, the cost is proportional to the number of documents and the proportionality constant is denoted $c_a$.

The cost model 14 also supplies the query optimizer 10 with statistics extracted from the textual data. For a predicate column i in field i, two statistics are of interest: predicate selectivity $s_i$ and predicate fanout $f_i$. Predicate selectivity $s_i$ is defined as the probability that a term (which can be a word or a phrase) in column i occurs in field i of some document. Predicate fanout $f_i$ is the average number of the documents in which a term in column i occurs in field i. Predicate selectivity $s_i$ is used in estimating the reduction effect of probing, and predicate fanout $f_i$ is used in estimating the result-set size.

To estimate these statistics, sampling techniques are employed. Terms from column i are sampled, the text retrieval system is accessed to check if they appear in field i of some document, and if so the frequencies are obtained. The estimates thus obtained are maintained by the query optimizer 10, and the sampling cost are amortized over many queries with the same predicate. An alternative is to store the entire word frequency distribution from the text source in the database system 4. This would allow estimation of both statistics locally, though the cost of storage would be significant. However, this alternative approach is not feasible when the text source does not export its distribution. Another alternative is a hybrid scheme where only the most frequent words (e.g., top 5%) are maintained and the frequencies of the rest are estimated. See C. A. Lynch, "Selectivity Estimation and Query Optimization in Large Databases with Highly Skewed Distributions of Column Values," VLDB, 1988. Such a technique only allows us to locally estimate the fanout but not the selectivity.

The cost model also needs to have predicate correlation. When there are more than one text join predicates, the joint selectivity and the joint fanout need to be estimated. The joint fanout estimation has been studied elsewhere. See L. Gravano et al., "The Effectiveness of Gloss for the Text Database Retrieval Problem," SIGMOD, 1994. For joint selectivity, if it is assumed that the terms in the join columns are correlated (i.e., frequently occurring together in the same documents), then the joint selectivity is equal to the minimum among them. On the other hand, if it is assumed that the terms in the join columns are independently distributed in documents, then the joint selectivity should be the product of selectivities. The joint selectivity is generalized as follows.

Given a set K of k predicates with selectivities $s_1, \ldots, s_k$, the joint selectivity may depend on the g most selective predicates. If $s_{i1} \leq \ldots \leq s_{ik}$, $1 \leq i_t \leq k$, then the joint selectivity in a g-correlated cost model is:

$$S_{g,K} = \prod_{i=1}^{g} s_{il}$$

For example, a 1-correlated cost model assumes full correlation. Extending this to the joint fanout, if $f_{j1} \leq \ldots \leq f_{jk}$, $1 \leq j_t \leq k$, the joint fanout in a g-correlated cost model is:

$$F_{g,K} = \prod_{i=1}^{g} f_{ji}/D^{g-1},$$

where D is the total number of documents in the database.

The cost formulas for join methods that reflect the total resource usage are now described. The cost formulas presented here are for multi-column joins. Those for single-column joins are similarly derived. Since the cost of reading the relation is the same for all join methods, this component of the cost is emitted. The formulas are also simplified by ignoring caching costs. It is assumed that the joining relation has N tuples and there are k joining columns (the set of the joining columns is K): column 1 in field 1 and . . . and column i in field i and . . . and column k in field k.

Some useful expressions for the cost formulas are first derived. Suppose n searches are sent out to the text system, each search being formed by tuple substitution into a subset J of the join columns. The total number of documents in the n result sets is $V_{n,J}=n \times F_{g,J}$. Some of these documents may match more than one search. The number of distinct documents matched is (assuming terms in different tuples occur independently in documents): $U_{n,J}=n \times D \times (1-(1-F_{g,J}/D)^n)$. The sum of the lengths of the inverted lists retrieved for processing these searches is also of interest. If it is assumed that a posting contains only a docid, and that the column width is one, then the sum is $\Sigma_{i \in J} f_i$. For n searches, the sum is $n\Sigma_{i \in J} f_i$.

The formula for tuple substitution follows from the above derivation and is as follows:

$$C_{TS}=C_iN+c_rL_{N,K}+c^s_t V_{N,K}$$

During probing, the total number of probes is equal to the number of distinct tuples in the projection of the probe columns. This number is denoted by $N_J$, where J is the set of probe columns. For a single column probe, the number of distinct values in the probe column estimates $N_J$. For multi-column probes, $N_J$ is estimated by $\min(\prod_{i \in J} N_i, N)$, where $N_i$ is the number of distinct values in column i. This is an overestimation and thus ensures that probing is favored only when the default method of tuple substitution is expected to perform significantly worse. The probe cost is thus:

$$C_P=c_iN_J+c_rL_{N_J,J}+c^s_t V_{N_J,J}$$

After probing, tuple substitution is done for tuples whose probes succeed. The number of such tuples is $R=NS_{g,J}$. So the total cost for probing with tuple substitution is $$C_{P+TS}=C_P+c_iR+c_rL_{R,K}+c^s_t V_{R,K}$$

For probing with relational text processing, the probing cost is the same as above. Full documents retrieved for relational text processing are cached on the relational side, so a document that satisfies more than one probe is transmitted only once. The cost of relational processing is as follows. For each successfully probed tuple (R of them), the documents retrieved by the probe are processed. On average, this number is $F_{g,J}$. Thus, after processing all R tuples, the cost is proportional to $V_{R,J}$. The total cost for probe with relational text processing is thus:

$$C_{P+RTP}=C_P+c^l_t V_{N_J,J}+c_a V_{R,J}$$

Based on the cost model discussed above, the query optimizer 10 chooses one of the join methods when the join is with a single relation. For the probe-based join methods, an optimal set of probe columns must be determined. The procedure to determine the probe columns is now discussed for the probe with tuple substitution join method.

Consider the case of single column probes. The optimal one-column probe can be determined in time linear in the number of join columns with the text retrieval system 6 by iterating over the latter. However, since the cost of probing on a column depends on the number of unique values in that column as well as on the selectivities of the predicates on that column, the optimal single column is not necessarily the column which has predicates with minimal join selectivity, as illustrated in the following example.

Example: For simplicity, assume that in text system under consideration the cost of invocation dominates significantly, thus $c_r=c_t=0$. In such a model, the cost of probe with tuple substitution on ith column is $N_i+s_iN$. Thus, even if $s_i>s_j$, the probe on ith column may still be better than the probe on column j if $N_i+s_iN<N_j+s_jN$.

As the number of probing columns is increased, more join predicates are evaluated as part of the probing phase. The joint join selectivity of these predicates is lower than predicates on one of the columns. On the other hand, the number of distinct values in the group of probing columns (i.e., the parameter $J_R$ in the cost formulas) increase when probing columns are increased. Because of these two opposing factors, increasing the number of probing columns may or may not lower the cost of probing with tuple substitution. The following example shows that a two column join may dominate a single column join.

Example: Consider the cost model where joint selectivity is given by the product of the individual selectivities. For simplicity, consider only the invocation cost. Assume that there are three join predicates on columns 1, 2 and 3. Note that N denotes the number of tuples in the relation.

$N=10^7$, $N_1=10^3$, $N_2=N_3=10$, $s_1=0.005$, $s_2=s_3=0.01$

It may be seen that $N_1$ is the best choice for the single column case, but $\{N_1,N_2\}$ is the best two column probe.

In general, if there are join predicates with the text retrieval system 6, in the worst case each predicate may be on a distinct column. Therefore, there could be as many as $2^k$ subsets of columns each of which qualifies as the optimal set of probing columns. Thus, choosing among them may take $O(2^k)$ time. However, the complexity of determining the optimal set of probe columns for 1-correlated models of joint selectivity is surprisingly low. In fact, for 1-correlated cost models, the optimal set of probing columns has at most 2 columns. Therefore, determining the optimal set of probe columns takes $O(k^2)$ time. The above rule can be generalizes J-correlated cost models where the number of columns in the optimal probe is no more than $Min(k,2J)$. In the presence of an existing order on the join columns of the relation, the cost of optimal probe is compared with the cost of probing on the ordered columns. Note that the latter incurs no cache lookup or update cost.

When the join is with more than one relation, the execution space that results is extended for the single relation situation. The execution of a query is traditionally represented syntactically as annotated join trees where the internal node is a join operation and each leaf node is a base table. See e.g., S. Ganguly et al., "Query Optimization for Parallel Execution," SIGMOD, 1992. The annotations to the join trees provide details such as selection conditions, choice of access paths and join algorithms. The set of all annotated join trees for a query that are considered by the query optimizer 10, is traditionally called the execution space of the query. The aim of the query optimizer 10 is to produce an execution plan of least cost from a given execution space. Traditionally, the execution space has been limited to left-deep join trees which correspond to linear orderings of joins. The optimality of a plan is with respect to a cost model. So far as the cost model is concerned, it is assumed that the cost model satisfies the principle of optimality which enables use of a dynamic-programming based solution. A well-known technique for choosing an optimal linear ordering of joins in the query uses dynamic programming. Selinger et al., "Access Path Selection in a Relational Database," SIGMOD, 1979.

The invention is able to provide an extended execution space which facilitates greater optimization. The simplest approach is to treat the foreign join no differently from any other relational join from the perspective of execution space. In this case, one of the join nodes in the left-deep trees could be a join with the text system. In such a case, no changes to the enumeration algorithm would be needed. However, if we treat a foreign join as a relational join, then all join and selection predicates on the text retrieval system are evaluated together. Such an evaluation strategy is appropriate for relational systems since once a tuple has been obtained by index access or as a result of a join, the remaining selection and join predicates can be evaluated with no I/O cost. The situation in case of accesses to text databases is quite different. First, evaluation of a join predicate between the text database and the relational table requires that the joining column on the relational side is instantiated. Therefore, by requiring that all join predicates are evaluated together, the join is delayed until all join predicates are evaluable. However, as the following example shows that the above scheme may not be optimal.

Consider the following example query Q5 which identifies documents published in 1993 and co-authored by a student and faculty from another department.

Q5: Select student.name, mercury.docid
From student, faculty, docid
Where student.name in mercury.author and faculty.name in mercury.author and faculty.dept!=student.dept and 'May 1993' in mercury.year If all join predicates with mercury are evaluated together, then the join between student and faculty must precede the join with Mercury. However, the only join predicate in such a case is faculty.dept!=student.dept, which is expected to be of low selectivity. On the other hand, few of the students write articles. Therefore, the predicate student.name in mercury.author has high selectivity. Therefore, if the above predicate is evaluated before the join with faculty, it reduces the size of the student relation, thereby lowering the cost of the join between student and faculty. The evaluation of the predicate student.name in mercury.author can be achieved by sending a probe from student to mercury. Finally, the remaining join predicate with the text system is evaluated.

In the above scheme, the use of probe as a semi-join of the relation student by mercury helped reduce the cost of the join between student and mercury. In turn, this also helped reduce the cost of evaluating the remaining join predicate on the text system since the join of the reduced student relation with mercury is significantly less than the cost of the join of the full student relation with mercury.

Consequentially, the execution space of the query optimizer 10 is defined to contain the following set of execution trees: (1) every left-deep tree; and (2) every left-deep tree which is augmented with additional probe nodes placed between two relational join nodes or between a scan node (for a relation) and a relational join node. (Such probe nodes must precede the join node with the text system.) The set of execution trees are called PrL trees. The PrL trees allow for the possibility of reducing relations by using the selectivity of the text join predicates. The restriction that such probe nodes precede the join node with the text is meaningful since any probes following the text join node are redundant. Thus, in the previous example, the execution where there was a probe node between the scan node for student and the join node between student and faculty, is a PrL tree but not a left-deep tree. Techniques to choose an optimal PrL tree are described in the attached paper in Appendix A. This paper entitled "Join Queries with External Text Sources: Execution and Optimization Techniques, by Chaudhuri et al., is to be published in the Proceedings of the 1995 ACM SIGMOD Conference on Management of Data, San Jose 1995. The paper, although attached as an appendix and therefore included herein, is hereby incorporated by reference, so that the paper can later replace the Appendix.

Although the techniques described above for integration with text systems, the techniques generalize to other external data managers. The join methods based on probing rely on the fact that each predicate on the foreign system must be evaluated by index look-up (i.e., no access to data itself), which is true of storage systems for image and other multimedia objects as well. Likewise, the conclusions about the execution space for multi-join queries apply whenever evaluation of foreign predicates is through indexes only. Thus, the inventive techniques described herein apply generally to broader classes of foreign systems.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described.

Hence, all suitable modifications and equivalents may be resorted to as falling within the scope of the invention.

What is claimed is:

1. A method for executing a conjunctive query that includes joins of structured data from a structured database system and external textual data from a text retrieval system, the joins having multiple join predicates, comprising:

(a) selecting at least one probing column from the multiple join predicates; and (b) reducing execution time of the conjunctive query by probing the external textual database to eliminate redundant queries to the external textual database which produce no matching documents.

2. A method for processing a conjunctive query that includes joins of structured data from a structured database and external textual data from a text retrieval system, comprising:

(a) selecting at least one probing column from the multiple join predicates if one or more of the joins has multiple join predicates;

(b) determining an estimated cost of at least one probe-based optimization plan;

(c) determining an estimated cost of at least one conventional optimization plan;

(d) selecting one of the optimization plans based on the lowest estimated cost; and (e) evaluating the conjunctive query in accordance with the selected optimization plan.

3. A method as recited in claim 2, wherein when the selected optimization plan is a probe-based optimization plan, said evaluating (e) comprises:

(e1) sending text search/retrieve operations to the text retrieval system to obtain a result set of matching text documents;

(e2) probing the external textual database to determine presence of matching text documents; and (e3) avoiding said sending (e1) of certain of the text search/retrieve operations if said probing (e2) indicates that the certain of the text search/retrieve operations find no matching documents.

4. A method as recited in claim 3, wherein said evaluating (e) further comprises (e4) joining the result set with relations of the conjunctive query associated with the structured data.

5. A method as recited in claim 3, wherein when the selected optimization plan is a conventional optimization plan, said evaluating (e) comprises: sending text search/retrieve operations to the text retrieval system to obtain a result set of matching text documents without probing the external textual database.

6. An apparatus as recited in claim 5, wherein said structured database system further includes a probe cache for storing results of previously performed probes.

7. An apparatus as recited in claim 6, wherein said query executor further reduces execution time by performing said probing only when the optimal execution plan is a probe-based execution plan and when said probe cache does not already store the results of said probing.

8. An apparatus as recited in claim 7, wherein said structured database system further includes a document cache for storing the matching documents retrieved from the external textual database, the matching documents stored in said document cache being associated with entries in said probe cache.

9. A loosely integrated database system capable of evaluating a conjunctive query that includes joins of structured data and external textual data, the joins having multiple join predicates, comprising:

a text retrieval system having textual data; and a structured database system having structured data, said structured database system comprising:

a query optimizer for selecting an optimal execution plan from a plurality of available execution plans based on cost; and a query executor for executing the optimal execution plan to evaluate the conjunctive query, wherein when the optimal execution plan is a probe-based execution plan, said query executor reduces execution time of the conjunctive query by probing the external textual database to eliminate redundant queries to the external textual database which produce no matching documents.

* * * * *